Patented Feb. 10, 1942

2,272,378

UNITED STATES PATENT OFFICE 2,272,378

PREPARATION OF LOWER SUGARS

Eugene J. Lorand, Wilmington, Del., assignor to Hercules Powder Company, Wilmington, Del., a corporation of Delaware No Drawing. Application September 8, 1939, Serial No. 293,978

19 Claims. (Cl. 260—594)

This invention relates to a method of preparing lower sugars by the condensation of formaldehyde.

It has long been known that formaldehyde could be condensed to a mixture of sugars. The condensation was carried out with the aid of alkaline catalysts, the formaldehyde being in dilute aqueous solution in concentrations of below 4%. Attempts to use higher concentrations resulted in formation of a considerable portion of polymers built from carbon-oxygen-carbon linkages, instead of the desired carbon to carbon condensation linkage. Considerable formation of higher sugars also resulted. Even at lower formaldehyde concentrations, the sugars obtained were largely of the higher type. Commercial preparation of lower sugars from formaldehyde has, therefore, been impractical.

It has been proposed to decrease the quantity of higher sugars formed in condensation by oxidizing or reducing the lower sugars as they are formed. However, these measures are only partly successful, and furthermore they do not allow the recovery of the lower sugars as such. In all the methods proposed, alkaline catalysts have been used to bring about condensation.

It is an object of this invention to provide a method of preparing 2 to 4 carbon atom sugars from formaldehyde in relatively concentrated solutions thereof.

It is a further object to bring about the condensation of formaldehyde with a high yield of condensate and especially with a high yield of 2 to 4 carbon atom sugars.

It is a still further object to provide a method of condensing formaldehyde which minimizes the formation of carbon-oxygen-carbon linkages which lead to aldehyde polymers and acetals, but in which condensates having carbon to carbon linkages predominantly are formed.

It is a still further object to provide a method of condensing formaldehyde in which either gaseous formaldehyde or the convenient polymeric forms of formaldehyde may be utilized.

These objects are achieved according to this invention by condensing formaldehyde in substantially anhydrous media under non-alkaline conditions in contact with suitable catalysts. The condensation is carried out at elevated temperatures with the formaldehyde in relatively concentrated substantially anhydrous solution in an inert reaction medium. The reaction mixture is formulated so as to insure non-alkaline conditions throughout the condensation reaction.

The formaldehyde which is utilized in the method of this invention may be gaseous, substantially anhydrous formaldehyde obtained, for example, by evaporation of paraformaldehyde. However, preferably paraformaldehyde is used directly. Alternatively, other formaldehyde polymers, such as alpha- and beta-polyoxymethylenes, etc., may be used. The use of the term "formaldehyde" herein and in the claims will be understood to refer to formaldehyde in its simplest form, or in the form of its lower polymers, or in the form of any complexes formaldehyde or its lower polymers may form upon solubilization with the solvent medium utilized in the method of this invention.

The reaction medium which is employed in the process of this invention, is a solvent of formaldehyde under the conditions of reaction and is inert in the process in other respects. For example, the lower aliphatic alcohols, such as methanol, ethanol, propanol, iso-propanol, butanol, isobutanol, etc. or polyhydric alcohols, such as ethylene glycol, propylene glycol, glycerol, tri-methylene glycol, etc. are suitable. Other solvents which may be utilized as reaction media are dioxane, mixtures of the alcohols, mixtures of the alcohols with benzene etc. In all cases, the solvent will be substantially anhydrous.

By "substantially anhydrous" as used herein and in the claims is meant freedom from water except for the small quantity which may be associated with the commercial forms of the various formaldehyde polymers or as an impurity in the solvents hereinbefore mentioned.

It is to be noted that the solid polymers of formaldehyde are mostly insoluble in the solvents mentioned as examples of suitable reaction media. However, upon mixing the polymer with the solvent and heating, the polymer breaks down to formaldehyde or its lower polymers which dissolve in the solvent. This solubilization step takes place at temperatures lower than those required for condensation. The concentration of formaldehyde or its polymers in the reaction mixture may be within wide limits. The concentration will be in excess of about 5%, for example, it may be within the range from 5% to about 50% or even higher. Preferably however, the concentration will be within the range from about 25% to about 40%.

In the process according to this invention, non-alkaline conditions are carefully maintained. A neutral reaction mixture can be used but, to assure maintenance of non-alkaline conditions throughout the reaction, care is preferably taken to have the reaction mixture definitely acid before the condensation reaction is started. Acid conditions may be conveniently established by introducing an acid into the reaction mixture with the formaldehyde or formaldehyde polymer, or after solubilization of the formaldehyde has been achieved. Preferably, organic carboxylic acids, such as formic, acetic, propionic, glycolic, benzoic, oxalic acid, etc. are utilized to insure a condition of acidity. Although acid conditions are established and maintained, a large excess of acid is preferably avoided since a slight acidity gives the best results.

Conveniently sufficient acid, for example, formic acid, is added to the reaction mixtue so that after the catalyst is added and the formaldehyde has been solubilized, the mixture will be acid to bromthymol blue. This indicator functions in anhydrous media such as anhydrous methanol. A more accurate and preferable method of determining the acidity of the reaction mixture, so that accurate regulation may be obtained, is by titration of a representative sample of the reaction mixture including catalyst, in solution or suspension, and the formaldehyde. The sample of reaction mixture is titrated with standardized potassium hydroxide solution. The acidity, expressed numerically herein and in the claims, is the number of milligrams of potassium hydroxide required to neutralize a quantity of reaction mixture containing the equivalent of 100 grams of formaldehyde. In the process of this invention, the acidity of the reaction mixture may be varied from zero to that point at which too large an excess of acidity reduces the efficiency of the reaction, this point varying with the solvent, temperature, catalyst, etc., utilized. Preferably the acidity is adjusted to a value in the range from about 70 to about 180.

A variety of catalysts has been found suitable for the condensation step of the process according to this invention. The catalyst may be soluble, insoluble, or slightly soluble in the reaction mixture. Compounds, of lead, zinc, and magnesium for example have been found suitable. Lead compounds are preferably utilized since they promote highest yields of the lower sugars. For example, lead formate, lead acetate, lead propionate, lead stearate, lead palmitate, etc. are suitable. Lead oxide, lead hydroxide, lead carbonate, or uncleaned strips of lead may conveniently be added to the reaction mixture with adjustment of the acidity thereof in the manner hereinbefore described. Zinc oxide, zinc hydroxide, magnesium oxide, or magnesium hydroxide may similarly be added to the reaction mixture and the mixture then adjusted in acidity, but it has been found that yields using these compounds are poorer than those obtained when using lead compounds.

The quantity of condensation catalyst utilized in the process of this invention depends upon the nature of the catlyst, the type of operation (whether continuous or batch), the size of the operation, the temperature at which the condensation is conducted, etc. For example, it has been found that operations in which agitation is inefficient require more catalyst. In general, from about 2 to about 15 parts of catalyst per thousand parts of formaldehyde are used but these figures are given to illustrate a preferable range of operation and are not to be considered as limiting.

The temperature of reaction during the condensation step likewise is dependent upon other conditions, such as the reaction medium utilized, the nature and amount of the catalyst, the concentration of the formaldehyde, etc. Using methanol as the reaction medium and a lead compound as the catalyst, the reaction temperature may vary, for example, from about 100° C. to about 150° C. preferably from about 120° C. to about 130° C.

In order to obtain a maximum yield of the lower sugars with a minimum formation of higher sugars, it is advantageous to carry out the condensation under a combination of favorable conditions. Preferably the minimum quantity of catalyst required to bring about condensation at a temperature in the preferred range is determined. Next, the temperature of reaction is carefully lowered until the lowest temperature of convenient operation is determined. Finally, the shortest period of heating required to react fully or substantially fully, i. e. leaving only enough formaldehyde unreacted to give a slight odor thereof, is determined. In this manner, the least drastic conditions are readily determined for any particular combination of catalyst and reaction medium so that the highest possible yield of lower sugars is obtained.

In carrying out the method of this invention, the ingredients of the reaction mixture may be charged into an autoclave equipped with an agitator and a suitable jacket for heating and cooling. If gaseous formaldehyde is used, it is merely bubbled into the reaction solvent to dissolve it. If a solid formaldehyde polymer is utilized, it is stirred into the solvent and the temperature raised until solubilization is achieved. The acid used to assure non-alkaline conditions may be added at this time. Preferably the mixture is sampled and the sample titrated as soon as solubilization of the formaldehyde has taken place to be certain that the desired acidity has been achieved. The acidity is then adjusted if necessary. The autoclave is then heated to reaction temperatures. Upon completion of the reaction, the contents of the autoclave are cooled. The contents are agitated throughout all of these steps. The pressure in the autoclave will be the vapor pressure of the contents at the temperature of reaction.

Preferably the contents of the autoclave are rapidly cooled at the completion or substantial completion of the condensation reaction. Preferably also the catalyst is promptly removed by filtration or decantation if it is insoluble in the reaction mixture, or the catalyst may be precipitated, for example, by treatment with sulphuric acid, metallic zinc, or hydrogen sulphide after which the precipitate may be removed by filtration. In this manner further condensation of the condensate to higher sugars is prevented.

The lower sugars may then be recovered by evaporation of the reaction solvent, preferably at a reduced pressure. Volatile acid present is evaporated with the solvent. It will be appreciated that the use of a volatile reaction medium solvent such as methanol, and the use of a volatile acid such as formic acid for adjusting acidity of the reaction mixture facilitates recovery of the product.

Alternatively the condensation reaction of this invention may be carried out continuously. This may be accomplished by passing the solution of formaldehyde, at a suitable temperature and rate, through a mass of condensation catalyst and cooling the solution, or by dispersing the catalyst in the formaldehyde solution and pumping the mixture so obtained at a suitable rate through a reaction vessel maintained at a suitable temperature and then cooling the mixture.

By the method in accordance with this invention, a substantially theoretical yield of condensate is obtained. The lower sugars will constitute about 50% to about 90% of the total condensate. The condensate may be recovered from the reaction solvent or alternatively it may be used for the preparation of other compounds in its reaction solvent.

In order to illustrate more fully the process of the present invention, the following examples are given. In the examples and in the specification and claims, all parts and percentages are by weight unless otherwise specified.

Example 1

A Monel metal autoclave having a capacity of 500 cc. was charged with 90 g. of paraformaldehyde (95% $CH_2O$), 192 g. of methanol, and 1.0 g. of lead formate. Sufficient formic acid was added to the mixture so that the mixture in the autoclave was slightly acid in reaction. The autoclave was fastened to a frame revolving in an oil bath which was equipped with suitable means for regulating its temperature. The mixture in the autoclave was then heated for 65 minutes at 124–126° C., agitation being attained by rotation of the autoclave in its frame. The autoclave was then removed from the bath, cooled, and opened. A light colored solution was obtained having only a very faint formaldehyde odor. The condensate was recovered by removing the catalyst and evaporating off the methanol in vacuo. The yield of condensate was very nearly 100% of the formaldehyde charged. The condensate consisted of about 65–75% of lower sugars.

Example 2

A stainless steel autoclave equipped with a paddle-type agitator was charged with 400 parts of paraformaldehyde, 800 parts of methanol, and 1.0 part of lead hydroxide. The mixture was made slightly acid in reaction by the addition of a small amount of formic acid. The autoclave was then heated in an oil bath to a temperature of 124° C., which took about an hour, and the temperature was then allowed to drop slowly. The total time of treatment at temperatures between 116° C. and 124° C. was 57 minutes, of which 5 minutes were at the maximum temperature. The contents of the autoclave were agitated during this treatment. The autoclave was then cooled and the contents filtered to remove the catalyst. The methanol was then evaporated off in vacuo. 380 parts of a very viscous solution was obtained. About 75% of this syrup consisted of the lower sugars.

Example 3

Gaseous formaldehyde was prepared by the dry distillation of paraformaldehyde. The gas was absorbed in cool anhydrous methanol until the solution obtained had a content of 32% of formaldehyde as determined by titration. The autoclave used in Example 1 was charged with 258 g. of this solution and with 2 strips of old sheet lead. After slightly acidifying the mixture, it was heated in the oil bath as mentioned in Example 1 for 40 minutes at a temperature of 120° C. The product was recovered in the manner of Example 1. A theoretical yield of condensate containing 60–70% lower sugars was obtained.

Example 4

The autoclave of Example 1 was charged with 90 g. of paraformaldehyde and 192 g. of anhydrous ethyl alcohol containing 1–2% of benzene. A strip of sheet lead with uncleaned surfaces was used as a catalyst. Care was taken to secure an acid reaction in the mixture by the addition of a small amount of acetic acid. The autoclave was heated for 35 minutes to 135° C. in an oil bath as mentioned in Example 1, and the product recovered as in Example 1, distilling off the ethanol in vacuo. There was obtained a thin syrupy product in a yield of 93% of which about 55% consisted of lower sugars.

Example 5

The autoclave of Example 1 was charged with 90 g. of paraformaldehyde, 96 g. of methanol, 96 g. of benzene, and 0.5 g. of lead hydroxide. Glycolic acid was added to the mixture, thereby slightly acidifying. The autoclave was heated for 20 minutes to 135° C. and the condensate recovered in the manner of Example 1. Practically theoretical yield of the condensate having a content of about 50–60% of the lower sugars was obtained.

Example 6

An electrically heated stainless steel autoclave, having a capacity of 400 cc., was charged with 90 g. of paraformaldehyde, 192 g. of dioxan, and 0.5 g. of lead hydroxide. The mixture was made slightly acid and heated for about an hour at 150° C., the reaction mixture being agitated by rocking the autoclave. The catalyst was removed and the dioxan evaporated from the condensate in vacuo. A yield of 87% was obtained, about half of it consisting of lower sugars.

Example 7

The autoclave of Example 6 was charged with 90 g. of paraformaldehyde, 200 g. of normal butanol, and 2 g. of lead stearate. After slight acidification, the mixture was heated for about 100 minutes at temperatures in the range of 129–138° C. Upon cooling and opening the autoclave, it was found the formaldehyde odor had completely disappeared. The condensate was recovered by evaporating off the butanol in vacuo, a yield of 66% was obtained.

Example 8

The autoclave of Example 1 was charged with 90 g. of paraformaldehyde and 192 g. of ethylene glycol. A strip of old sheet lead was placed in the autoclave to act as catalyst. A small amount of glycolic acid was added and the mixture was heated to 130° C. for 30 minutes and cooled in the manner of Example 1. The reaction product mixture had only a very faint formaldehyde odor. The condensate was not isolated in this example but was subjected to hydrogenation in its reaction solvent with the aid of Raney nickel catalyst. A mixture of the lower polyhydric alcohols was thereby obtained. This mixture was then nitrated, forming an explosive.

Example 9

The stainless steel autoclave of Example 6 was charged with 90 g. of paraformaldehyde, 192 g. of methanol, and 0.7 g. of precipitated zinc hydroxide. After acidification, the mixture was heated for about 50 minutes to a temperature of about 140–155° C. The mixture was cooled and the condensate recovered by filtering the reaction product solution and evaporating off the methanol in vacuo. A yield of about 60% of condensate was obtained.

*Example 10*

The autoclave of Example 1 was charged with 90 g. of paraformaldehyde, 192 g. of methanol, and 0.5 g. of lead oxide (PbO). Formic acid was then added in such an amount that the mixture attained an acidity value of 73 as determined by titration with standard potassium hydroxide. The mixture was then heated for 30 minutes to a temperature of 125° C. and the autoclave cooled and opened in the manner of Example 1. The formaldehyde odor had practically disappeared. The reaction mixture was then filtered and the methanol was evaporated off in vacuo. The theoretical yield of condensate was obtained. The condensate contained about 65% lower sugars.

*Example 11*

The autoclave of Example 1 was charged with 90 g. of paraformaldehyde, 90 g. of methanol, and 0.5 g. of lead hydroxide. The mixture was acidified, heated for about 50 minutes at a temperature of 120° C., and cooled in the manner of Example 1. The formaldehyde odor had completely disappeared from the reaction mixture. The catalyst was removed by filtration. The condensate was not isolated but was hydrogenated in the methanol solution using a nickel catalyst, thereby forming a mixture of the lower polyhydric alcohols. The methanol was evaporated therefrom and the polyhydric alcohols were separated by a vacuum distillation.

*Example 12*

The autoclave of Example 1 was charged with 60 g. of paraformaldehyde, 250 g. of methanol, and 0.5 g. of lead hydroxide. After acidification, the mixture was heated for 31 minutes at 124–125° C. and cooled in the manner of Example 1. Only a very faint formaldehyde odor was noticeable upon opening the autoclave. A practically theoretical yield of condensate was obtained, the condensate consisting of about 60–70% lower sugars.

By the method in accordance with this invention, the lower sugars themselves are obtained and are readily recoverable since they may readily be obtained in fairly concentrated solution in volatile solvents. These hydroxy aldehydes and ketones may be condensed with amines to produce antioxidants, or they may be used in the preparation of artificial resins. The hydroxyl groups confer unusual properties to these derivatives. The lower sugars may also be converted to hydroxy acids such as glycolic acid, glyceric acid, etc. by oxidation. The lower sugars may also be reduced, for example, by hydrogenation to polyhydric alcohols. The mixture of polyhydric alcohols, obtained when the mixed lower sugars are hydrogenated, may be separated into its components, for example, by fractional distillation at reduced pressures. The polyhydric alcohols, either separated or mixed, are useful in the preparation of synthetic resins, explosives, antifreeze compositions, etc.

By the terms "lower sugars" and "2–4 carbon atom sugars" is meant the monosaccharides having 2–4 carbon atoms, for example, glycolaldehyde, glyceraldehyde, dihydroxy acetone, ketotetrose, and the various aldotetroses in aldehydric or lactol forms.

It will be understood that the details and examples hereinbefore set forth are illustrative only, and that the invention as broadly described and claimed is in no way limited thereby.

What I claim and desire to protect by Letters Patent is:

1. A process for the preparation of 2 to 4 carbon atom sugars comprising the step of condensing formaldehyde in non-alkaline substantially anhydrous solution in an inert solvent therefor while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

2. A process for the preparation of 2 to 4 carbon atom sugars comprising the step of condensing formaldehyde in non-alkaline substantially anhydrous solution in an inert solvent therefor, at a temperature in the range from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

3. A process for the preparation of 2 to 4 carbon atom sugars comprising the step of condensing formaldehyde in non-alkaline substantially anhydrous solution in an alcohol solvent therefor, at a temperature in the range from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

4. A process for the preparation of 2 to 4 carbon atom sugars comprising the step of condensing formaldehyde in non-alkaline substantially anhydrous solution in a monohydric alcohol solvent therefor, at a temperature in the range from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

5. A process for the preparation of 2 to 4 carbon atom sugars comprising the step of condensing formaldehyde in non-alkaline substantially anhydrous solution in methanol, at a temperature in the range from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

6. A process for the preparation of 2 to 4 carbon atom sugars comprising the step of condensing formaldehyde in non-alkaline substantially anhydrous solution in methanol, at a temperature in the range of from about 100° C. to about 150° C., while in contact with a lead compound as a condensation catalyst, whereby sugars of 2 to 4 carbon atoms are formed.

7. A process for the preparation of 2 to 4 carbon atom sugars comprising the step of condensing formaldehyde in acidic substantially anhydrous solution in methanol, at a temperature in the range of from about 100° C. to about 150° C., while in contact with a lead compound as a condensation catalyst whereby sugars of 2 to 4 carbon atoms are formed.

8. A process for the preparation of 2 to 4 carbon atom sugars comprising the step of condensing formaldehyde in acidic substantially anhydrous solution in methanol, at a temperature in the range of from about 100° C. to about 150° C., while in contact with a lead salt of a fatty acid; whereby sugars of 2 to 4 carbon atoms are formed.

9. A process for the preparation of 2 to 4 carbon atom sugars comprising the step of condensing formaldehyde in acidic substantially anhydrous solution in methanol, at a temperature in the range of from about 100° C. to about 150° C., while in contact with lead formate, whereby sugars of 2 to 4 carbon atoms are formed.

10. A process for the preparation of 2 to 4 carbon atom sugars comprising the step of condensing formaldehyde in acidic substantially anhydrous solution in methanol, at a temperature in the range of from about 100° C. to about 150° C., while in contact with lead acetate, whereby sugars of 2 to 4 carbon atoms are formed.

11. A process for the preparation of 2 to 4 carbon atom sugars comprising the step of condensing formaldehyde in acidic substantially anhydrous solution in methanol, at a temperature in the range of from about 100° C. to about 150° C., while in contact with lead formate, the condensation mixture having an acidity value of about 70 to about 180, whereby sugars of 2 to 4 carbon atoms are formed.

12. A process for the preparation of 2 to 4 carcarbon atom sugars comprising the step of condensing formaldehyde in acidic substantially anhydrous solution in methanol, at a temperature in the range of from about 100° C. to about 150° C., while in contact with lead acetate, the condensation mixture having an acidity value of about 70 to about 180, whereby sugars of 2 to 4 carbon atoms are formed.

13. A process for the preparation of 2 to 4 carbon atom sugars comprising the step of condensing formaldehyde in non-alkaline substantially anhydrous solution in a polyhydric alcohol solvent therefor, at a temperature in the range of from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

14. A process for the preparation of 2 to 4 carbon atom sugars comprising the step of condensing formaldehyde in non-alkaline substantially anhydrous solution in ethylene glycol, at a temperature in the range of from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

15. A process for the preparation of 2 to 4 carbon atom sugars comprising the step of condensing formaldehyde in acidic substantially anhydrous solution in a polyhydric alcohol solvent therefor, at a temperature in the range of from about 100° C. to about 150° C., while in contact with a condensation catalyst selected from the group consisting of the oxides, hydroxides, carbonates and organic salts of the metals, lead, magnesium, zinc and the alkaline earth metals, whereby sugars of 2 to 4 carbon atoms are formed.

16. A process for the preparation of 2 to 4 carbon atom sugars comprising the step of condensing formaldehyde in acidic substantially anhydrous solution in ethylene glycol, at a temperature in the range of from about 100° C. to about 150° C., while in contact with a lead compound as a condensation catalyst, whereby sugars of 2 to 4 carbon atoms are formed.

17. A process for the preparation of 2 to 4 carbon atom sugars comprising the step of condensing formaldehyde in acidic substantially anhydrous solution in ethylene glycol, at a temperature in the range of from about 100° C. to about 150° C. while in contact with a lead salt of a fatty acid whereby sugars of 2 to 4 carbon atoms are formed.

18. A process for the preparation of 2 to 4 carbon atom sugars comprising the step of condensing formaldehyde in acidic substantially anhydrous solution in ethylene glycol, at a temperature in the range of from about 100° C. to about 150° C. while in contact with lead formate whereby sugars of 2 to 4 carbon atoms are formed.

19. A process for the preparation of 2 to 4 carbon atom sugars comprising the step of condensing formaldehyde in acidic substantially anhydrous solution in ethylene glycol, at a temperature in the range of from about 100° C. to about 150° C. while in contact with lead formate, the condensation mixture having an acidity value of about 70 to about 180, whereby sugars of 2 to 4 carbon atoms are formed.

EUGENE J. LORAND.